(No Model.)
A. SIEBEL.
APPARATUS FOR CRYSTALIZING CANDIES.
No. 456,293. Patented July 21, 1891.
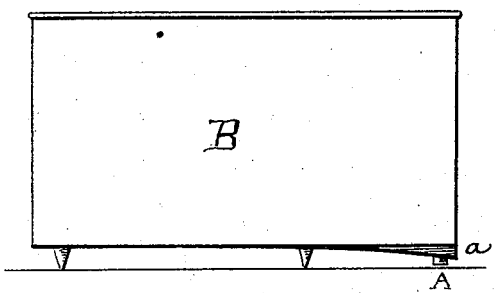
Fig 1.
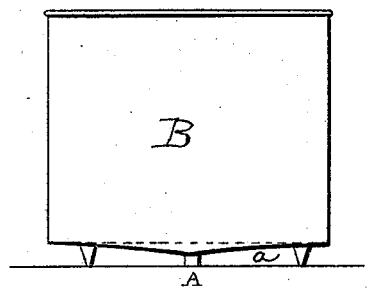
Fig II.
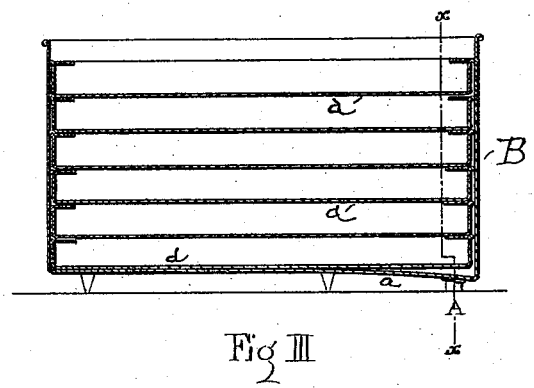
Fig III.
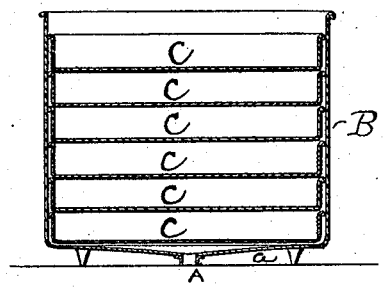
Fig IV.
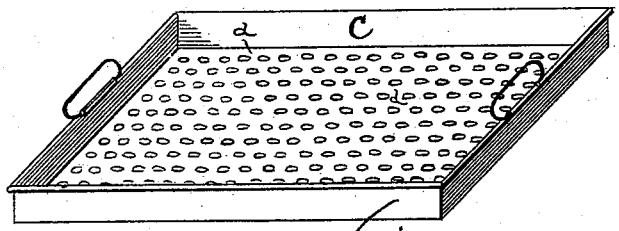
Fig V.
Witness
O. G. Fowler
Charles W. Light
Inventor
Adolph Siebel

UNITED STATES PATENT OFFICE.

ADOLPH SIEBEL, OF SAGINAW, MICHIGAN.

APPARATUS FOR CRYSTALLIZING CANDIES.

SPECIFICATION forming part of Letters Patent No. 456,293, dated July 21, 1891.

Application filed May 7, 1890. Serial No. 350,946. (No model.)

*To all whom it may concern:*

Be it known that I, ADOLPH SIEBEL, a citizen of the United States, residing at Saginaw, county of Saginaw, and State of Michigan, have invented a Crystallizing Apparatus, which is a certain new and useful Improvement in Apparatus for Crystallizing Candies; and I do hereby declare that the following is a full, clear, and exact description of the invention, which will enable others skilled in the art to which it appertains to use the same.

My invention relates to improvements in candy-crystallizing apparatus.

Heretofore candies have been crystallized in ordinary tin pans set anywhere exposed to dust and insects, the sirup being poured on the candy in the pan and after crystallization poured off by tilting the pan.

The object of my invention is to simplify and facilitate the process of crystallization. I attain these objects by the apparatus illustrated in the accompanying drawings, in which—

Figure I is a side view of the apparatus resting upon its low standards, and tap or outlet A at lowest point of inclined bottom. Fig. II is a front view of the apparatus, showing standards, inclined bottom, and tap or outlet. Fig. III is a longitudinal sectional view of the apparatus, showing the pans as they appear arranged one above the other in actual use. Fig. IV is a cross-section on line x x of Fig. III. Fig. V shows one of the pans having a perforated bottom.

My apparatus consists of a box or vat B, to be constructed in any desired shape or size or of any desired material, and provided with an inclined bottom a, pitching toward a certain point, at which it is provided with a tap or outlet A. I prefer to close the outlet with a common screw-cap, because a stop-cock becomes clogged by sirup, any desired number of low pans c, constructed with perforated bottoms d, Fig. V, fitting closely into box or vat B.

The articles to be crystallized are placed side by side into pans such as are shown by Fig. V, which are then set, one on top of the other, into the box or vat B, as shown in Figs. III and IV. The sirup is poured in at the top of the box or vat over the contents of the pans, and after crystallization is completed outlet A is opened and the superfluous sirup drained off without disturbing the pans and leaving their contents in clean and perfect condition.

What I claim as my invention, and desire to secure by Letters Patent, is—

In a candy-crystallizer, the combination, with a square or rectangular box of same size at bottom as at top and provided with an inclined bottom, and an outlet located at the bottom of the box at the lowest point of the incline, of a column of pans of the shape of the box and adapted to be placed within the box, resting one upon another, the lower one resting upon the upper edge of the inclined bottom, each pan having a perforated bottom and raised sides or edges, upon which the pan above rests, substantially as described, as and for the purpose set forth.

ADOLPH SIEBEL.

Witnesses:
C. G. FOWLER,
CHAS. W. LIGHT.